US008024718B2

(12) United States Patent
Miranda et al.

(10) Patent No.: US 8,024,718 B2
(45) Date of Patent: Sep. 20, 2011

(54) SYSTEM AND METHOD FOR OPTIMIZING SOURCE CODE

(75) Inventors: Miguel Miranda, Kessel-lo (BE); Francky Catthoor, Temse (BE); Martin Janssen, Vaals (NL); Hugo De Man, Kessel-lo (BE)

(73) Assignee: IMEC, Leuven (BE)

( * ) Notice: Subject to any disclaimer, the term of this patent is extended or adjusted under 35 U.S.C. 154(b) by 1363 days.

(21) Appl. No.: 11/284,338

(22) Filed: Nov. 21, 2005

(65) Prior Publication Data

US 2006/0080645 A1 Apr. 13, 2006

Related U.S. Application Data

(63) Continuation of application No. 09/760,129, filed on Jan. 12, 2001, now abandoned.

(60) Provisional application No. 60/176,248, filed on Jan. 14, 2000.

(51) Int. Cl.
*G06F 9/44* (2006.01)

(52) U.S. Cl. ......... 717/152; 717/151; 717/159; 717/160

(58) Field of Classification Search .................. None
See application file for complete search history.

(56) References Cited

U.S. PATENT DOCUMENTS

| 4,953,084 A | 8/1990 | Meloy et al. |
| 5,491,823 A | 2/1996 | Ruttenberg |
| 5,577,253 A | 11/1996 | Blickstein |
| 5,586,020 A | 12/1996 | Isozaki |
| 5,613,117 A | 3/1997 | Davidson et al. |
| 5,692,169 A | 11/1997 | Kathail et al. |
| 5,836,014 A | 11/1998 | Faiman, Jr. |
| 6,588,009 B1 | 7/2003 | Guffens et al. |

OTHER PUBLICATIONS

Ghez et al, Systematic High-Level Address Code Transformations for Piece-wise Linear Indexing:Illustration on a Medical Imaging Algorithm, 2000 IEEE Workshop on Signal Processing Systems, Oct. 2000 pp. 603-612, Retrieved on [Jan. 15, 2010] Retrieved from the Internet:URL<http://ieeexplore.ieee.org/stamp/stamp.jsp?tp=&arnumber=886758&isnumber=1915.*

Gupta et al. Analysis of High-Level Address Code Transformations for Programmable Processors, Proceedings of the Conference on Design, automation, and test in Europe, 2000, pp. 9-13, Retrieved from the Internet:URL<http://delivery.acm.org/10.1145/350000/343683/p9-gupta.pdf?key1=343683&key2=5624853621&coll=GUIDE&dl=&CFID=71404620&CFTOKEN=74607235.*

(Continued)

*Primary Examiner* — Michael J Yigdall
*Assistant Examiner* — Cheneca Smith
(74) *Attorney, Agent, or Firm* — Knobbe Martens Olson & Bear LLP

(57) ABSTRACT

One aspect of the invention includes a method of address expression optimization of source-level code. The source-level code describes the functionality of an application to be executed on a digital device. The method comprises first inputting first source-level code that describes the functionality of the application into optimization system. The optimization system then transforms the first source-level into a second source level that has fewer nonlinear operations than the first source-level code.

40 Claims, 13 Drawing Sheets

OTHER PUBLICATIONS

Wilson et al, SUIF: An Infrastructure for Research on Parallelizing and Optimizing Compilers, ACM SIGPLAN Notices, pp. 31-37, Dec. 1994, Retrieved on [Apr. 18, 2011], Retrieved from the Internet: URL<http://delivery.acm.org/10.1145/200000/193217/p31-wilson.pdf?key1 =193217&key2=5287313031&coll=DL&dl=ACM&ip=151.207.242.4&CFID=15379944&CFTOKEN=5544017>.*

Van Engelen et al, An Efficient Alogorithm for Pointer-to-Array Access Conversion for Compiling and Optimizing DSP Applications, Innovative Architecture for Future Generation High-Performance Processors and Systems (IWIA'01), 2001, pp. 80-89, Retrieved from the Internet:URL<http://ieeexplore.ieee.org/stamp/stamp.jsp?tp=&arnumber=955200>.*

Liem, et al., "Address Calculation for retargetable Compilation and Exploration of Instruction-Set Architecture," Proceedings 33$^{rd}$ Design Automation Conference, 1996. pp. 597-600.

Miranda, et al., "High Level Address Optimisation and Synthesis Techniques for Data-Transfer Intensive Applications", IEEE Transactions on VLSI Systems, vol. 6, No. 4, pp. 677-686, Dec. 1998.

Miranda, et al., ADOPT: Efficient Hardware Address Generation in Distributed Memory Architecture, 1996, IEEE, p. 20-25.

Balasa, et al., "Transformation of Nested Loops with Modulo Indexing to Affine Recurrences", 1994, World Scientific Pub., Parallel Processing Letters, p. 1-12.

Hong, et al., "Throuput Optimization of General Non-Linear Computations," 1999, IEEE, p. 406-409.

Janssen, et al., "A Specification Invariant Technique for Regularity improvement between Flow-Graph Clusters," 1996. IEEE, p. 138-143.

* cited by examiner

```
for (y=0; y<M+3; ++y) {
  for (x=0; x<N+5; ++x) {
    ...
    if ((x-3)>=1 && (x-5)<=N-2 && (y-2)>=1 && (y-3)<=M-2) {
      if ((x-5)>=1 && (y-3)>=1) {
        if (out_compute == 255) {
          if (comp_edge_pixels[((x-4)%3)*3+(y-2)%3]<comp_edge_middle) out_compute=0;
          ...
          if (comp_edge_pixels[((x-4)%3)*3+(y-4)%3]<comp_edge_middle) out_compute=0;
          ...
          if (comp_edge_pixels[((x-5)%3)*3+(y-4)%3]<comp_edge_middle) out_compute=0;
          ...
        }
      }
      if ((x-3)<=N-2 && (y-2)<=(M-2)) {
        maxdiff_compute =
          max13(abs(gauss_xy_pixels[((x-2)%3)*3+(y-1)%3]
                  - gauss_xy_middle), maxdiff_compute);
        ...
        maxdiff_compute =
          max13(abs(gauss_xy_pixels[((x-2)%3)*3+(y-3)%3]
                  - gauss_xy_middle), maxdiff_compute);
        ...
        maxdiff_compute =
          max13(abs(gauss_xy_pixels[((x-3)%3)*3+(y-3)%3]
                  - gauss_xy_middle), maxdiff_compute);
        ...
      }
    }
    ...
  }
}
```

FIG. 3

```
for (y=0; y<M+3; ++y) {
  for (x=0; x<N+5; ++x) {
    ...
    if(x>=4 && x<=N+3 && y>=3 && y<=M+1) {
      if((x-5)>=1 && (y-3)>=1) {
        if (out_compute == 255) {
          csexmin4mod3x3 = ((x-4)%3)*3;
          cseymin4mod3 = (y-4)%3;
          if(comp_edge_pixels[csexmin4mod3x3 +(y-2)%3]<comp_edge_middle) out_compute=0;
          ...
          if(comp_edge_pixels[csexmin4mod3x3 +cseymin4mod3]<comp_edge_middle) out_compute=0;
          ...
          if(comp_edge_pixels[((x-5)%3)*3 +cseymin4mod3]<comp_edge_middle) out_compute=0;
          ...
        }
      }
      if ((x-3)<=N-2 && (y-2)<=(M-2)) {
        csexmin2mod3x3 = ((x-2)%3)*3;
        cseymod3 = y%3;  /* = (y-3)%3  */
        maxdiff_compute =
          max13(abs(gauss_xy_pixels[csexmin2mod3x3 + (y-1)%3]
                    - gauss_xy_middle), maxdiff_compute);
        ...
        maxdiff_compute =
          max13(abs(gauss_xy_pixels[csexmin2mod3x3 + cseymod3]
                    - gauss_xy_middle), maxdiff_compute);
        ...
        maxdiff_compute =
          max13(abs(gaus_xy_pixels[(x%3)*3 + cseymod3]
                    - gauss_xy_middle), maxdiff_compute);
        ...
      }
    }
    ...
  }
}
```

FIG. 4

```
distributivity:        (x + 4)%3  =  (x%3 + 4%3)%3
constant folding:                 =  (x%3 + 1)%3
constant unfolding:               =  (x%3 + 1%3)%3
invert distributivity:            =  (x + 1)%3
                       (a)

modulo expansion: (x+2)%3 = 3 - x%3 - (x+1)%3

```
for (y=0; y<M+3; ++y) {
  cseymod3 = y%3;
  cseymin1mod3 = (y-1)%3;
  cseymin2mod3 = (y-2)%3;
  cseymin4mod3 = (y-4)%3;
  for (x=0; x<N+5; ++x) {
    ...
    if(x>=4 && x<=N+3 && y>=3 && y<=M+1) {
      if((x-5)>=1 && (y-3)>=1) {
        if (out_compute == 255) {
          csexmin4mod3x3 = ((x-4)%3)*3;
          if(comp_edge_pixels[csexmin4mod3x3 +cseymin2mod3]<comp_edge_middle) out_compute=0;
            ...
          if(comp_edge_pixels[csexmin4mod3x3 +cseymin4mod3]<comp_edge_middle) out_compute=0;
            ...
          if(comp_edge_pixels[((x-5)%3)*3 +cseymin4mod3]<comp_edge_middle) out_compute=0;
            ...
        }
      }
      if ((x-3)<=N-2 && (y-2)<=(M-2)) {
        csexmin2mod3x3 = ((x-2)%3)*3;
        maxdiff_compute =
          max13(abs(gauss_xy_pixels[csexmin2mod3x3 + cseymin1mod3]
                - gauss_xy_middle), maxdiff_compute);
            ...
        maxdiff_compute =
          max13(abs(gauss_xy_pixels[csexmin2mod3x3 + cseymod3]
                - gauss_xy_middle), maxdiff_compute);
            ...
        maxdiff_compute =
          max13(abs(gaus_xy_pixels[(x%3)*3 + cseymod3]
                - gauss_xy_middle), maxdiff_compute);
            ...
      }
    }
    ...
  }
}
```

FIG. 6

```
cseymod3 = -1;
for (y=0; y<M+3; ++y) {
  cseyminlmod3 = cseymod3;
  cseymod3 = y%3;
  cseymin2mod3 = 3-cseymod3-cseyminlmod3;
  for (x=0; x<N+5; ++x) {
    ...
    if(x>=4 && x<=N+3 && y>=3 && y<=M+1) {
      if((x-5)>=1 && (y-3)>=1) {
        if (out_compute == 255) {
          csexmin4mod3x3 = ((x-4)%3)*3;
          if(comp_edge_pixels[csexmin4mod3x3 +cseymin2mod3]<comp_edge_middle) out_compute=0;
          ...
          if(comp_edge_pixels[csexmin4mod3x3 +cseyminlmod3]<comp_edge_middle) out_compute=0;
          ...
          if(comp_edge_pixels[((x-5)%3)*3 +cseyminlmod3]<comp_edge_middle) out_compute=0;
          ...
        }
      }
      if ((x-3)<=N-2 && (y-2)<=(M-2)) {
        csexmin2mod3x3 = ((x-2)%3)*3;
        maxdiff_compute =
          max13(abs(gauss_xy_pixels[csexmin2mod3x3 + cseyminlmod3]
                - gauss_xy_middle), maxdiff_compute);
        ...
        maxdiff_compute =
          max13(abs(gauss_xy_pixels[csexmin2mod3x3 + cseymod3]
                - gauss_xy_middle), maxdiff_compute);
        ...
        maxdiff_compute =
          max13(abs(gaus_xy_pixels[(x%3)*3 + cseymod3]
                - gauss_xy_middle), maxdiff_compute);
        ...
      }
    }
    ...
  }
  ...
}
```

FIG. 7

```
cseymod3 = -1;
for (y=0; y<M+3; ++y) {
  cseymin1mod3 = cseymod3;
  cseymod3 = y%3;
  cseymin2mod3 = 3-cseymod3-cseymin1mod3;
  for (x=0; x<N+5; ++x) {
    ...
    if(x>=4 && x<=N+3 && y>=3 && y<=M+1) {
      csexmod3x3 = (x%3)*3;
      csexmin2mod3x3 = ((x-2)%3)*3;
      csexmin4mod3x3 = ((x-4)%3)*3;
      csexmin5mod3x3 = ((x-5)%3)*3;
      if((x-5)>=1 && (y-3)>=1) {
        if (out_compute == 255) {
          if(comp_edge_pixels[csexmin4mod3x3 +cseymin2mod3]<comp_edge_middle) out_compute=0;
          ...
          if(comp_edge_pixels[csexmin4mod3x3 +cseymin1mod3]<comp_edge_middle) out_compute=0;
          ...
          if(comp_edge_pixels[csexmin5mod3x3 +cseymin1mod3]<comp_edge_middle) out_compute=0;
          ...
        }
      }
      if ((x-3)<=N-2 && (y-2)<=(M-2)) {
        maxdiff_compute =
          max13(abs(gauss_xy_pixels[csexmin2mod3x3 + cseymin1mod3]
                  - gauss_xy_middle), maxdiff_compute);
        ...
        maxdiff_compute =
          max13(abs(gauss_xy_pixels[csexmin2mod3x3 + cseymod3]
                  - gauss_xy_middle), maxdiff_compute);
        ...
        maxdiff_compute =
          max13(abs(gaus_xy_pixels[csexmod3x3 + cseymod3]
                  - gauss_xy_middle), maxdiff_compute);
        ...
      }
    }
    ...
  }
  ...
}
```

FIG. 8

```
cseymod3 = -1;
for (y=0; y<M+3; ++y) {
  cseyminlmod3 = cseymod3;
  cseymod3 = y%3;
  cseymin2mod3 = 3-cseymod3-cseyminlmod3;
  for (x=0; x<N+5; ++x) {
    csexmod3x3 = (x%3)*3;
    csexmin2mod3x3 = ((x-2)%3)*3;
    csexmin4mod3x3 = ((x-4)%3)*3;
    csexmin5mod3x3 = ((x-5)%3)*3;
    ...
    if(x>=4 && x<=N+3 && y>=3 && y<=M+1) {
      if((x-5)>=1 && (y-3)>=1) {
        if (out_compute == 255) {
          if(comp_edge_pixels[csexmin4mod3x3 +cseymin2mod3]<comp_edge_middle) out_compute=0;
          ...
          if(comp_edge_pixels[csexmin4mod3x3 +cseyminlmod3]<comp_edge_middle) out_compute=0;
          ...
          if(comp_edge_pixels[csexmin5mod3x3 +cseyminlmod3]<comp_edge_middle) out_compute=0;
          ...
        }
      }
      if ((x-3)<=N-2 && (y-2)<=(M-2)) {
        maxdiff_compute =
          max13(abs(gauss_xy_pixels[csexmin2mod3x3 + cseyminlmod3]
               - gauss_xy_middle), maxdiff_compute);
        ...
        maxdiff_compute =
          max13(abs(gauss_xy_pixels[csexmin2mod3x3 + cseymod3]
               - gauss_xy_middle), maxdiff_compute);
        ...
        maxdiff_compute =
          max13(abs(gaus_xy_pixels[csexmod3x3 + cseymod3]
               - gauss_xy_middle), maxdiff_compute);
        ...
      }
    }
    ...
  }
  ...
}
```

FIG. 9

```
cseymod3 = -1;
for (y=0; y<M+3; ++y) {
  cseymin1mod3 = cseymod3;
  cseymod3 = y%3;
  cseymin2mod3 = 3-cseymod3-cseymin1mod3;
  csexmod3x3=-3;
  for (x=0; x<N+5; ++x) {
    csexmin1mod3x3 = csexmod3x3;
    csexmod3x3 = (x%3)*3;
    csexmin2mod3x3 = 9-csexmod3x3-csexmin1mod3x3;
    ...
    if(x>=4 && x<=N+3 && y>=3 && y<=M+1) {
      if((x-5)>=1 && (y-3)>=1) {
        if(out_compute == 255) {
          if(comp_edge_pixels[csexmin1mod3x3 +cseymin2mod3]<comp_edge_middle) out_compute=0;
          ...
          if(comp_edge_pixels[csexmin1mod3x3 +cseymin1mod3]<comp_edge_middle) out_compute=0;
          ...
          if(comp_edge_pixels[csexmin2mod3x3 +cseymin1mod3]<comp_edge_middle) out_compute=0;
          ...
        }
      }
      if ((x-3)<=N-2 && (y-2)<=(M-2)) {
        maxdiff_compute =
          max13(abs(gauss_xy_pixels[csexmin2mod3x3 + cseymin1mod3]
               - gauss_xy_middle), maxdiff_compute);
        ...
        maxdiff_compute =
          max13(abs(gauss_xy_pixels[csexmin2mod3x3 + cseymod3]
               - gauss_xy_middle), maxdiff_compute);
        ...
        maxdiff_compute =
          max13(abs(gaus_xy_pixels[csexmod3x3 + cseymod3]
               - gauss_xy_middle), maxdiff_compute);
        ...
      }
    }
    ...
  }
  ...
}
```

FIG. 10

```
cseymod3 = -1;
for (y=0; y<M+3; ++y) {
  cseymin1mod3 = cseymod3;
  cseymod3 = y%3;
  cseymin2mod3 = 3-cseymod3-cseymin1mod3;
  csexmod3x3=-3;
  cseymin1mod2 = (y-1)%2;
  cseymod2=1-cseymin1mod2;
  for (x=0; x<N+5; ++x) {
    csexmin1mod3x3 = csexmod3x3;
    csexmod3x3 = (x%3)*3;
    csexmin2mod3x3 = 9-csexmod3x3-csexmin1mod3x3;
    csexmin1x2 = (x-1)*2;
    csexmin3x2 = csexmin1x2-4;
         ...
    if (x>=3 && x<N+3 && y>=2 && y<M+2)
      tmparray[(csexmin3x2+ cseymod2)%160
                       + (csexmin3x2+ cseymod2)/160*256 + 96]
        = comp_edge_pixels[csexmod3x3
                           + cseymin2mod3] = maxdiff_compute;
         ...
    if (x>= 1 && x<N+1 && y>=1 && y<=M)
      tmparray[(csexmin1x2 + cseymin1mod2)%64
                       + (csexmin1x2 + cseymin1mod2)/64*256]
        = gauss_xy_pixels[csexmin1mod3x3
                          + cseymin1mod3] = gauss_xy_compute;
     } ...
  }
}
```

FIG. 11

```
cseymod3=-1;
for (y=0; y<M+3; ++y) {
  cseymin1mod3=cseymod3;
  cseymod3 ++;
  if(cseymod3 >= 3){cseymod3 -= 3;}
  cseymin2mod3 = 3-cseymod3-cseymin1mod3;
  cseymin1mod2 = (y-1)&1;
  cseymod2=1-cseymin1mod2;
  csexmod3x3= -3;
  csexx2mod160_1_2=cseymod2-8;
  csexx2div160_1_2=0;
  for (x=0; x<N+5; ++x) {
    csexmin1mod3x3=csexmod3x3;
    csexmod3 ++;
    if(csexmod3 >= 3){csexmod3 -= 3;}
    csexmod3x3=csexmod3*3;
    csexmin2mod3x3 = 9-csexmod3x3-csexmin1mod3x3;
    csexx2mod160_1_2+=2;
    csexmin1x2 = (x-1)*2;
    csexmin3x2 = csexmin1x2-4;
    if(csexx2mod160_1_2>=160) {csexx2mod160_1_2-=160;csexx2div160_1_2++;}
       ...
    if (x>=3 && x<N+3 && y>=2 && y<M+2)
      tmparray[csexx2mod160_1_2 + csexx2div160_1_2*256 + 96]
        = comp_edge_pixels[csexmod3x3
                           + cseymin2mod3] = maxdiff_compute;
       ...
    if (x>= 1 && x<N+1 && y>=1 && y<=M)
      tmparray[((csexmin1x2 + cseymin1mod2)&63)
                           + ((csexmin1x2 + cseymin1mod2)>>6)*256]
        = gauss_xy_pixels[csexmin1mod3x3
                           + cseymin1mod3] = gauss_xy_compute;
    ...
  }
}
```

FIG. 12

… # SYSTEM AND METHOD FOR OPTIMIZING SOURCE CODE

RELATED APPLICATION

The present application is a continuation of and incorporates by reference U.S. patent application Ser. No. 09/760,129, filed Jan. 12, 2001 now abandoned, which claims priority to and incorporates by reference, in its entirety, U.S. Provisional Application No. 60/176,248, filed Jan. 14, 2000, titled "An Apparatus and Method For Address Expression Optimisation."

BACKGROUND OF THE INVENTION

1. Field of the Invention

The field of the invention relates to digital devices. More particularly, the field of the invention relates to optimizing high-level source code for digital devices comprising programmable processors.

2. Description of the Related Technology

As is known in the art, a software application can be described by a high-level programming language or code, e.g., Pascal, Fortran, C++. Although there has been some research in the field of high-level programming language optimization, there has been little work done in the field of optimizing code that is targeted for programmable processors. For example, the article, Miranda M., Catthoor F., Janssen M. and De Man H., "High-level address optimization and synthesis techniques for data-transfer intensive applications", IEEE Transactions on VLSI systems, Vol. 6, No. 4, pp. 677-686, December 1998, describes a system for optimizing source code that is targeted for custom processors design or synthesis. However, this article fails to describe how address optimization can be applied in a context wherein resources are fixed or are predetermined.

Furthermore, the article, Liem C., Paulin P., Jerraya A., "Address calculation of retargetable compilation and exploration of instruction-set architectures", Proceedings 33$^{rd}$ Design Automation Conference, describes an approach for rewriting code for instruction-set architectures which uses detailed knowledge of a particular target architecture. Disadvantageously, this approach optimizes instruction-level code which is machine specific.

For example, in Liem, address expression optimization is performed on pointer types, which masks the actual address expression. Since instruction level code is typically longer than source code, pointer type optimization is typically limited to smaller blocks of the code. In instruction level optimization, a block of code typically relates to a branch of the code that is induced by a conditional statement. In Lien, since only parts of the code are examined in the optimization and due to the masking of the address expression, global optimization opportunities are overlooked. Furthermore, this approach does not describe how to provide optimization methods for partly programmable processors wherein the optimization method is processor-independent.

Thus, there is a need for examining address expression optimization for source code as opposed to instruction code. There is also a need for a system and method of optimizing high-level source code wherein the optimization is machine-independent.

SUMMARY OF THE INVENTION

One aspect of the invention includes a method of address expression optimization of source-level code, the source code describing the functionality of an application to be executed on a digital device, the method comprising: inputting a first source-level code that describes the functionality of the application, the first source-level code comprising address computation code and a plurality of arrays with address expressions, wherein at least the address computation code or one of the address expressions has nonlinear operations, and transforming the first source-level code into a second source-level code describing the same functionality as the first source-level code, wherein the second source-level code having fewer nonlinear operations than the first source-level code, and wherein the digital device comprises at least one programmable instruction set processor.

Another aspect of the invention includes a method of address expression optimization of source-level code, wherein the source-level code describes the functionality of an application to be executed on a digital device, the method comprising: inputting a first source-level code, describing the functionality of the application, the first source-level code, comprising arithmetic computation code and a plurality of arithmetic expressions in one or more algorithm statements, wherein the arithmetic computation code or one of the arithmetic expressions has nonlinear operations; and transforming the first source-level code into a second source-level code describing the same functionality as the first source-level code, wherein the second source-level code has fewer nonlinear operations than the first source-level code, and wherein the digital device comprises at least one programmable instruction set processor.

BRIEF DESCRIPTION OF THE DRAWINGS

FIG. 3 is a diagram showing exemplary source-level code that may be processed by the optimization system of FIG. 1.

FIG. 4 is a diagram showing the exemplary source code of FIG. 1 subsequent to an algebraic transformation and common subexpression elimination process of the optimization system of FIG. 1.

FIG. 5 is a diagram illustrating exemplary algebraic transformations that may be performed by the optimization system of FIG. 1.

FIGS. 6-8 are each diagrams of the source-level code of FIG. 4 subsequent to code "hoisting", respectively across inner conditionals (FIG. 6), outer conditionals, (FIG. 7) and iterator loops (FIG. 8).

FIG. 9 is a diagram showing the source code of FIG. 8 subsequent to performing a second iteration of algebraic transformations and common subexpression elimination.

FIG. 10 is a diagram showing the source code of FIG. 9 subsequent to applying a second iteration of code hoisting.

FIG. 11 is a diagram illustrating another piece of exemplary source code.

FIG. 12 is a diagram illustrating the source code of FIG. 11 subsequent to the optimization system of FIG. 1 reducing the operator strength of the source code.

DETAILED DESCRIPTION OF THE PREFERRED EMBODIMENT

The following detailed description is directed to certain specific embodiments of the invention. However, the invention can be embodied in a multitude of different ways as defined and covered by the claims.

Figure 1:
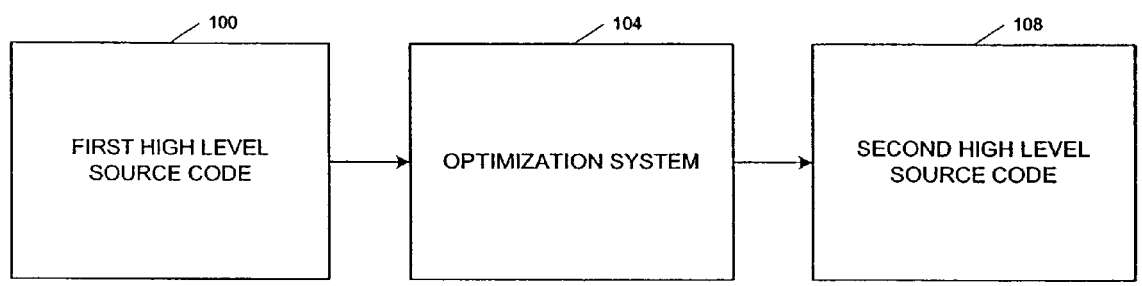
FIG. 1 is a dataflow diagram showing an optimization system for optimizing source-level code.

FIG. 1 is a dataflow diagram illustrating a process of optimizing a first high-level source code 100 into a second high-level source code 108 using an optimization system 104. The optimization system 104 may comprise hardware, software, or a combination thereof.

The high-level source code 100 describes an application that is targeted to be executed on a digital device having at least one programmable processor. The source code 100 can be in any high-level programming language such as: C, C++, BASIC, Pascal, Java, and Fortran. In one embodiment of the invention, the second high-level source code 100 is in the same language as the second high-level source code 100. Typically, the source-level code 100 typically has variables having address expressions.

Source-level descriptions are to be distinguished from instruction level descriptions. Instruction level descriptions include single operation instructions, each instruction having one or two operands and at most one operation per line of code. In source-level code, a line of code can have multiple operands and multiple operations. Before source code can be executed, it needs to be converted into compiled code.

By rewriting source code under the constraint that the functionality of the application is maintained, better execution of the application can be achieved. Better execution can include a reduction in power consumption or faster execution in term of run-cycles.

One aspect of the present invention relates to code rewriting for relatively fixed hardware resources, such as is found in general purpose programmable processors, e.g., general purpose RISC machines or more domain specific digital signal processors or ASIP. As part of the optimization process, the first source-level code 100 is transformed into a second source-level code 108. The transformation modifies address expressions and the address related arithmetic in the source code. Although, in the art, transformations limited to linear address expressions are known with respect to other types of technology, the optimization system 104 is not limited thereto as it can deal with nonlinear operations, such as modulo operations, integer divisions, power operations and multiplication operations.

In one embodiment of the invention, the optimization that is performed by the optimization system 104 is performed in a preprocessing step. A further compilation step, being hardware or software compilation is used, to turn the second high-level source code 108 into an executable software program, a hardware description, or combination thereof.

As an example, the optimization system 104 may be advantageously used with respect to high-level source code that defines multimedia applications. The addressing behavior of multimedia applications is dominated by a large amount of deeply nested loops where the loop iterators become variables in the expressions arithmetic within the loops. Therefore, because nested loops share common iterators, optimization is possible.

Figure 2:
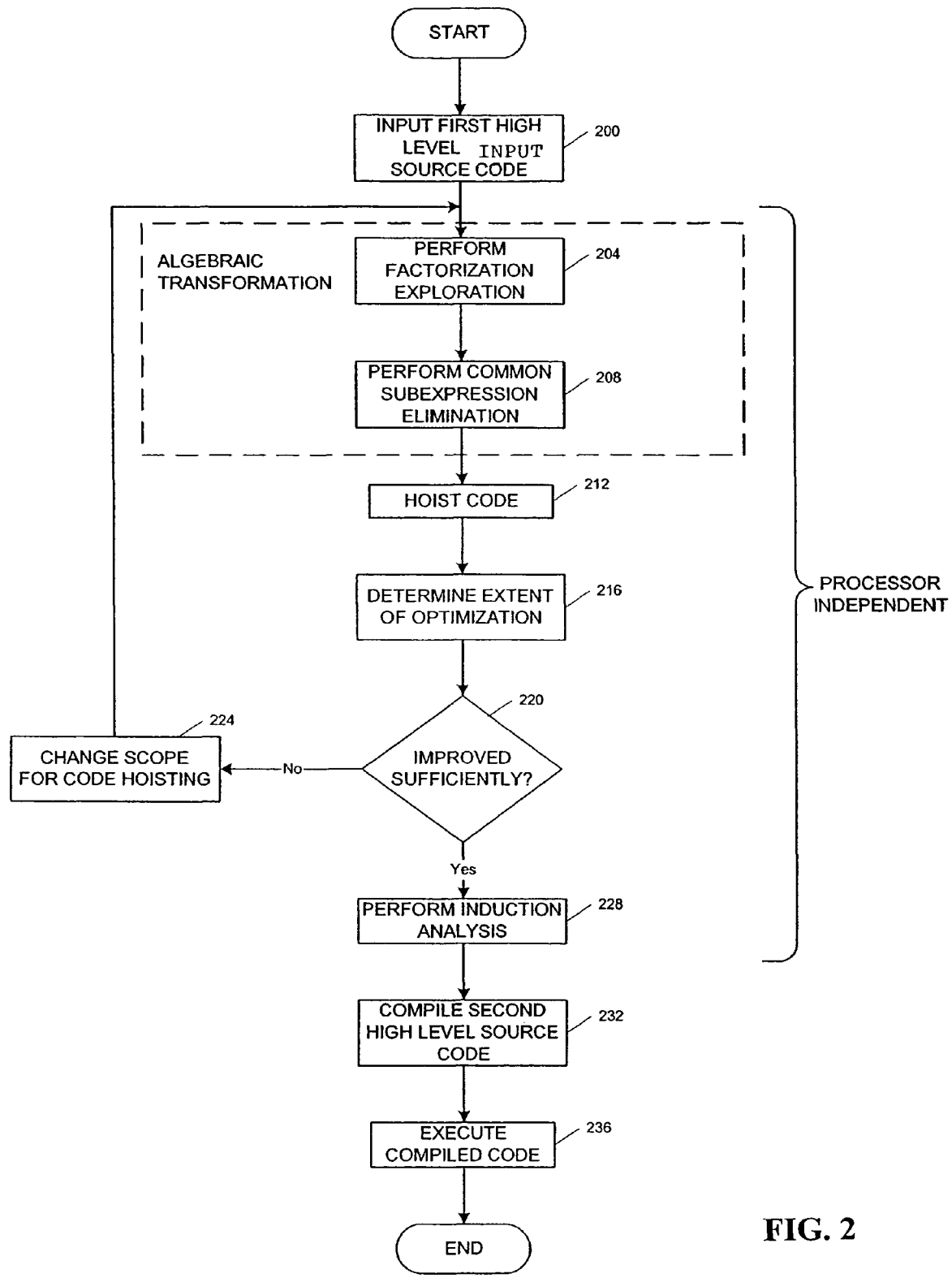
FIG. 2 is a flowchart illustrating an optimization process that is performed by the optimization system of FIG. 1.

FIG. 2 is a flowchart illustrating in overview one embodiment of an optimization process of the optimization system 104 (FIG. 1). It is noted that depending on the embodiment, selected or all of the steps in FIG. 2 may be performed manually instead of being performed by the optimization system 104. Starting at a state 200, the first high-level source code is input into the optimization system 104.

Next, the optimization system 104 performs algebraic transformations (state 204 and 208) on the source code. Algebraic transformation converts a piece of code into another algebraic equivalent piece of code. In one embodiment of the invention, algebraic transformations includes factorization exploration (state 204) and common subexpression elimination 208 (state 208).

Proceeding to a state 204, the optimization system 104 performs factorization exploration. The process of performing factorization exploration is described in further detail below. However, in general, the process is as follows. In source code, address or index expressions often share common factors. When this is the case, one can represent a common factor in the sharing expressions with a single variable, also called a literal, which can be computed higher within the code. By performing arithmetic transformations on the expressions, commonality between factors can be exploited to open up opportunities for the common subexpression elimination. One goal of factorization exploration is to find a representation which allows the reuse common expressions as much as possible. After this, the total number of nonlinear operations remains the same but now some expressions are identical. Hence, factorization exploration facilitates subsequent common subexpression elimination.

Continuing to a state 208, the optimization system 104 (FIG. 1) performs common subexpression elimination. The method of performing common subexpression elimination is described in further detail below. However, in general, the process of common subexpression elimination is as follows. Because of factorization exploration performed previously, many identical expressions are now present in the code. Common subexpression elimination stores the result of a computation in a variable in order to reuse it and hence to avoid redoing the same computation later. In one embodiment of the invention, this optimization is only performed if a respective computation appears several times.

Next, at the state 212, the optimization system 104 performs code hoisting. The method of performing code hoisting is set forth in further detail below. However, in general, the process of code hoisting is as follows. Code hoisting moves a piece of code from one place in the source code to another place in the source code without changing the function of the application. Code hoisting reduces the number of times the arithmetic operations, in particular in the address expressions, are executed. This reduction can be achieved by moving code operations to a higher "scope" where their number of executions is smaller, hence the step is also called a global scope code motion step.

In one embodiment of the invention, a range analysis step is used before applying code hoisting. In one embodiment of the invention, code hoisting is never applied to expressions which do not have overlapping ranges. Furthermore, code hoisting is only applied on expressions having at least one common factor.

The factorization (state 204) and common subexpresion elimination (state 208) steps focus separately on expressions within a selected scope. However, because of the similarity between address expressions, there can be opportunities to apply again a factorization/elimination step on expressions within larger scopes, i.e., code in different loop constructs or conditionals. However, this requires an analysis of the ranges of the iterators of each of the loop constructs and conditionals.

In one embodiment, the first iteration of the code hoisting step (state 212) is only performed with respect to expressions in conditional scopes. The later code hoisting steps perform code hoisting across loop constructs, whereby expressions are moved up in the loop hierarchy when possible, to reduce the number of times these are executed.

Proceeding to a state 216, the optimization system 104 determines the extent of the optimization that was performed in the states 204-212. Next, at a decision state 220, it determined whether the source code has been modified sufficiently depending on the cost of the resulting transformation.

The cost minimization problem can use any kind of optimization approach. As the actual cost associated with a source-level code is the cost in terms of power consumption, speed and other measures of performance of a digital device executing the source-level code, or even measures of performance of a digital device still to be designed, it is to be understood that only cost estimates are used within the cost minimization approach.

The efficiency of a cost minimization problem can be increased by selecting basic transformation steps which have a large impact. It is an aspect of the invention to use composite transformations which are each finite sequences of elementary transformations. The composite transformations have look-ahead local minima avoiding capabilities (described below). Elementary transformations are applied when a single set of preconditions are satisfied. The preconditions can be formulated at the level of the source code on which the elementary transformation will be applied but preferably an alternative representation of the source code is used as is explained further. A composite transformation is applied when one of a plurality of sets of preconditions are satisfied.

Local minima avoiding capabilities allow the optimization engine 104 to transform the first source-level code 100 having a first cost into the second source-level code 108 having a second cost, the second cost being lower than the first cost, and while executing the elementary transformation of which the composite transformation is composed of, intermediate source-level codes are generated, at least one of the intermediate source-level codes having a cost being larger than the first cost.

If the source code has not been modified sufficiently, the process proceeds to a state 224 wherein the scope of the optimization process is enlarged to cover greater portions of the code. The process then returns to the state 204 to perform another iteration of optimization.

Referring again to the decision state 220, if the source code has improved sufficiently, the process proceeds to a state 228 wherein linear variable induction analysis is performed. By using linear induction variable analysis, any remaining piecewise linear operations (like modulo or integer divisions) in the code are replaced by less costly arithmetic. The process of performing linear induction analysis is described in further detail below.

One particularly advantageous feature of the optimization system 104 is in the ordering of the above states that are performed by the optimization system 104. In custom hardware design, first induction analysis, then code hoisting and thereafter algebraic transformations are performed. In one embodiment of the optimization system 104, it is recognized that the ordering of the optimizations that are performed with respect to custom hardware design do not work well for programmable processors.

In one embodiment of the invention, the optimization advantageously performs the optimization steps in the following order: first algebraic transformations, thereafter code hoisting and thereafter induction analysis. Using these steps, it has been observed that greater optimizations are achieved with respect to code that to that is targeted for programmable processors. It has been observed that performing induction analysis first with respect to programmable processors leads to many more pointers than there are resources for such processors.

Data Model

Because source-level code is not a suitable format for automatic handling by a computing device, an alternative efficient representation of source-level code is used. In one embodiment of the invention, the optimization system 104 exploits a shared data-flow graph. The shared data-flow graph is used to represent the first, second and all intermediate source-level codes. The shared data-flow graph is a directed acyclic graph with homogeneous synchronous data-flow behavior. The graph is comprised of nodes, each of the nodes representing operations and signals that connect the node with other nodes. In one embodiment, no cycling of signals is allowed. In a homogeneous synchronous data-flow graph, on activation, a node reads one data value from each incoming edge and writes one data value to each outgoing edge. The data-flow graph is also referred to as a shared data-flow graph because multiple address (sub)expressions within the source-level code can be mapped to a single piece of the data-flow graph. This is implemented by using a select operation within the data-flow graph representation. The process of mapping source code to data-flow graphs is well known in the art. For example, see William B. Ackerman. "Data-Flow Languages", IEEE Computer, pages 15-23, February, 1982, which is incorporated by reference, in its entirety.

The use of a shared data-flow graph enables the joining of intrinsically disjunct graphs within a common graph, hence enabling larger optimization opportunities. A (sub)graph is disjunct when the related expressions have no iterators in common. When the related expressions have only a few iterators in common sharing can be beneficial. The concept of a shared data-flow graph allows for time-multiplexing of address calculations The transformations can be subdivided into two categories: (i) elementary transformations, and (ii) composite transformations.

Elementary Transformations

Elementary transformations are simple shared data-flow graph transformations having strict preconditions that check the validity of a transformation. Elementary transformations are the lowest level of transformations that are executed on a shared data-flow graph. In one embodiment of the invention, the elementary transformations are the only transformations that change the structure of a shared data-flow graph. Composite transformations compose sequences of elementary transformations. Composite transformations do not change the structure of a shared data-flow graph directly. For example, certain elementary transformations are shown in FIG. 5. It is noted that there are a number of other commonly known elementary transformations that may also be performed, e.g., replacing a multiply operation that includes a power-of-two constant with a shift operation with a constant.

Each elementary transformation is characterized by: (i) a source and target subgraph, (ii) handles, (iii) preconditions, (iv) postconditions, and (v) relationships. The source subgraph is the subgraph wherein a transformation is to be applied. The target graph is the subgraph resulting subgraph from a transformation. The handles specify the starting point for finding transformation candidates. The preconditions of a transformation define the conditions that have to be satisfied before the transformation can be executed. The postconditions of a transformation define the conditions that hold after the transformation has been executed. The relationships of a transformation define a mapping of characteristics between the subgraph defined by the transformation before being executed and the subgraph defined by the transformation after being executed.

The source and target subgraphs of an elementary transformation are parameterized, i.e., several aspects are allowed to vary, such as the type of an operation. The amount of variation is defined by the preconditions of an elementary transformation. Preconditions can be seen as patterns, which can be matched against parts of a shared data-flow graph to verify if the transformation can be applied there. The handles define a unique starting point for pattern matching. In case pattern matching is successful, the result is a set of valid values for the parameters of the source subgraph. To be able to create the appropriate target subgraph instance, these values are used in the relationships of the transformation to compute the set of valid values for the parameters of the target subgraph. The postconditions of an elementary transformation describe the situation in the target subgraph instance. This information is used when sequences of elementary transformations are composed.

Composite Transformations

Due to the strict preconditions of the elementary transformations, their applicability to many instruction sequences is very low. Thus, certain composite transformations are executed to improve their applicability. Composite transformations help determine which transformations should be performed and in which order. Composite transformations perform a limited look-ahead to determine when transformations should be performed.

Composite transformations work as follows. The strict preconditions of an elementary transformation are made more flexible by detecting "failures." A failure is detected when a precondition is not satisfied. For each non-fatal failure there exists a short sequence of transformations, which effectively repairs the failure such that the associated precondition is satisfied. Transformations can have several preconditions, and hence many combinations of failures can occur.

These combinations result in a dynamic composition of sequences of transformations. This approach provides a flexible and powerful approach to ordering transformations.

Factorization Exploration

The following text describes in further detail the factorization exploration steps that occur in state 204 of FIG. 2 for one embodiment of the optimization system 108. At this step, each of the operations in a selected scope of the code is analyzed so as to identify expressions that contain common factors.

The factorization exploration step is applied to those operations containing modulo arithmetic. FIG. 5 shows two examples of transformations that may be made with respect to expressions that are affected by a modulo operation.

As can be seen in FIGS. 5A and 5B, after this step, the total number of modulo operations in 5A and 5B remains the same but now the expressions are identical. Code that has been transformed by modulo expansion can be further optimized during code hoisting (described below).

Furthermore, for example, the following code segment

```
for(x=0;...) {
    A=(x+k1)%M;
    B=(x+k2)%M; }
``` can be transformed in following code segment

```
B=k2-1;
for(x=0;...) {
    if(B<=k2-k1-2)
        A=B-k2+k1+1+M;
    else
        A=B-k2+k1+1;
    B=(x+k2)%M;
```

The expression $A=(x+k1)\%M$ can be expressed by another expression $B=(x+k2)\%M$ together with a conditional, where x is a loop iterator incremented by 1 and k1, k2 are two constant values positive (or negative if the first value of x is greater than $-k1$ and $-k2$). Both expressions have a piecewise linear behavior. They are both incremented at the same time by one. The absolute difference between expressions A and B can take only two values, one equal to $k1-k2+1$ (when B has reached M and not A) and one equal to $k1-k2+1+M$ (in the opposite case). Therefore, after the transformation, B remains the same, A is derived from B and the if and else branches give the two possible values of difference between A and B, depending on the value of B.

Common Subexpression Elimination

The following text describes in further detail the common subexpression elimination steps that occur in state 208 of FIG. 2 for one embodiment of the optimization system 204. Common sub-expression elimination (CSE) stores the result of a computation in a variable in order to reuse it and hence to avoid redoing the same computation later. This optimization typically is used only if a selected computation appears several times in the code. Common subexpression elimination reduces the number of costly operations, e.g., modulo arithmetic, in the source code.

FIG. 4 is a diagram showing the source code of FIG. 3 subsequent to common subexpression elimination. As part of CSE, a variable has been defined for each common subexpression and each subexpression has been replaced with the respective variable. The variable is assigned to the value of the subexpression prior to the first of operation that uses the variable. For example, in FIG. 4, the expression "(y−4) % 3" is assigned to the variable "cseymin 4 mod3", and this variable is used later by the operations instead of the expression. It is noted that the common subexpression elimination only occurs with respect to expressions having the same scope. However, subsequent to code hoisting and in later iterations, there may be opportunities to apply again a factorization/CSE step on a larger scope.

Code Hoisting

The following text describes in further detail the process for code hoisting that occurs in state 208 of FIG. 2. Code hoisting reduces the number of times the arithmetic operations are executed. A reduction in arithmetic operations can be achieved by moving operations in a higher scope where their number of executions is smaller. Code hoisting includes two steps. First, code hoisting is performed with respect to conditionals. After an evaluation of the conditional ranges, code hoisting across conditionals per loop nest allows to move expressions out of conditionals scopes. Secondly, code hoisting across loops is performed, where expressions are moved up in the loop hierarchy when possible, to reduce the number of times these are executed. Each of these two types of code hoisting is discussed below.

Code Hoisting Across Conditionals

Code hoisting across conditionals can lead to either a gain or loss in performance. The result depends on the way conditional ranges are overlapping and on the amount of common factors between the considered expressions.

Figure 13:
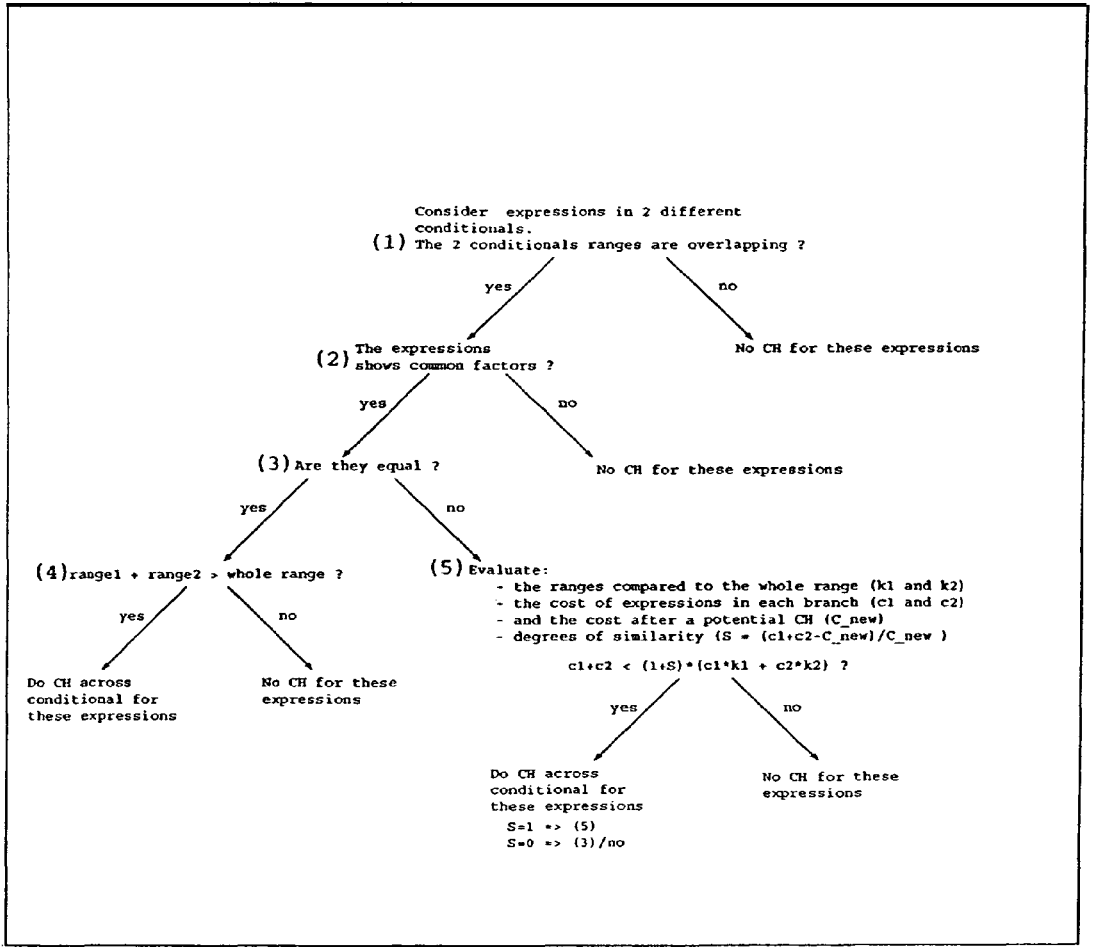
FIG. 13 shows a decision tree that may be used to decide for given expressions in two different conditional scopes whether it is beneficial to perform code hoisting.

FIG. 13 shows a decision tree that may be used to decide for given expressions in two different conditional scopes whether it is beneficial to do code hoisting. It is to be appreciated by the skilled technologist that other criteria may be used.

As a first decision (branch 1), it is determined whether the conditional ranges are overlapping. In one embodiment of the invention, conditional ranges of a loop iteration that they are contained within are overlapping if they are both true for any percentage of the loop iteration. In another embodiment of the invention, conditional ranges are considered overlapping if they are both true for a substantial, e.g., 50-100%, percentage of the loop that they are contained within. In another embodiment of the invention, the percentage may be input into the optimization system 104 by a programmer before or during the optimization process. If the two conditionals are not overlapping, the optimization does not perform code hoisting. However, if the conditional ranges are overlapping, the optimization system 104 decides whether the expressions have common factors (branch 2). If expressions in the conditional do not have common factors, then no code hoisting is performed. However if expressions in the conditional have common factors, the optimization system 104 determines whether the expressions are equal (branch 3). If the branches are equal, the optimization system 104 determines whether the range of the first conditional plus the range of the second conditional is greater than the whole range. The whole range is defined as the absolute difference between the loop iterator start and ending values where the conditionals are contained within.

If the sum of the ranges of each of the conditionals is not less than the whole range, no code hoisting is performed. However, if the sum of the ranges of each of the conditionals is greater than the whole range, code hoisting is preformed with respect to those common expressions.

Referring again to branch 3, if the expressions are not equal, a calculation is made to determine whether to perform code hoisting. In one embodiment of the invention, the calculation is as follows:

$$c1+c2<(1+S)*(c1*k1+c2*k2), \text{ wherein}$$

S is a similarity coefficient (between 0 and 1);
c1 is the cost of the first conditional;
c2 is the cost of the second conditional;
k1=range of first conditional/whole range (between 0 and 1); and
k2=range of second conditional/whole range (between 0 and 1).

A discussion of how to estimate the cost of the conditionals, e.g., c1 and c2, is set forth below. The search space for factorization and for code hoisting can be large. The decision tree of FIG. 13 may be advantageously used to prune away non-interesting possibilities.

For example, in FIG. 4, certain expressions in both scopes have common factor in the sense that they all have the form (x−constant)%3*3 or (y−constant)% 3. In this example, as part of the optimization process, the decision tree of FIG. 13 is traversed to decide on which expressions code hoisting are to be applied. Since the conditional ranges surrounding these expressions can for one embodiment of the invention said to be overlapping (branch (2)) and since expressions show common factors (branch (3)), the tree is traversed until branch (4).

FIGS. 6-8 are each diagrams of the source-level code of FIG. 4 subsequent to code "hoisting", respectively across inner conditionals (FIG. 6), outer conditionals, (FIG. 7) and iterator loops (FIG. 8). FIG. 9 is a diagram showing the source code of FIG. 8 subsequent to performing a second iteration of algebraic transformations and common subexpression elimination. FIG. 10 is a diagram showing the source code of FIG. 9 subsequent to applying a second iteration of code hoisting.

Code Hoisting Across Loops

One advantage of code hoisting across loops is that it reduces the number of times a certain operation is executed. As part of this process, the optimization system 104 analyzes the dependencies between the loop iterators and the expressions. For example, take for example two nested loop, the outer loop having an iterator y, the inner loop having an iterator x. In this example, some sub-expressions depend only on an iterator x and other ones only on an iterator y. Since y is the iterator of the outer loop, the expressions that reference iterator y do not change during the execution of x loop.

Therefore, these operations that do not change can be moved outside the scope of the x loop and thereby remove unnecessary computations. The code shown in FIG. 8 shows the code of FIG. 7 subsequent to code hoisting across loops.

Subsequent to code hoisting, the arithmetic in address expressions is now exposed for further factorization exploration and common subexpression elimination on more global scope.

Linear Induction Analysis

The following text describes in further detail the steps that occur in state 228 of FIG. 2. In one embodiment of the invention, before linear induction analysis is performed, the optimization system 104 (FIG. 1) has already performed algebraic transformations and common subexpression elimination on the code.

At this point, the number of executed operations is significantly reduced and in particular, the number of modulo operations. But often there still remaining non-linear operations present in the code. One goal of this step is to replace the remaining piece-wise linear operations (like modulo or integer divisions) by a less costly arithmetic. Furthermore, it is noted that this step is at the boundary between the processor independent and processor specific stages. In a first step, an analysis of all expressions containing modulo or division operations is performed. This analysis is part of the processor independent stage. At this first step, the optimization system 104 determines which expressions can be substituted by cheaper arithmetic. In a second step, the identified expressions are substituted. The code generation for this substitution is now processor specific since different ways of writing the same substitution are possible and the choice depends on the processor used. For example, many expressions are of the form "expression % value". If "value" is a power of two, well-known transformations may be used to remove the piece-wise linear operation.

If "value" is not a power of two, a more efficient solution for executing modulo/division operations can be still applied. If the right hand-side of the operator is a constant value and if the expression is a linear or a piece-wise linear function of a loop iterator in a loop construct, the expression can be transformed. To perform this transformation, several code instructions are introduced in the code to replace the selected operation. For each operator, one pointer ("variable") increment per loop and per operation is inserted into the source code.

Each pointer created is incremented at the beginning of the loop where the operation takes place and it is initialized in the previous loop of the nest. A test per pointer and per loop is also introduced to reset the pointer for the modulo or to increment the pointer in case of the division operation. This test is used the pointer that is associated with the modulo operation reaches the modulo value. The initialization value for the pointer is the one taken by the considered expression for the first value of the iterator. The amount of the increment is determined by the slope of the affine expression. Therefore, each expression affected by a modulo operation is transformed by an auto-incremented variable and a conditional. An expression affected by an integer division can also be transformed by using a pointer. Note that because of the relation between modulo and division (both gets reset or incremented at the same time as shown, only one conditional is required to follow their evolution, hence saving one conditional. When essentially all modulo and division operations have been transformed, the conditionals and increments related to each expression remains in the scope where they have been placed during the code hoisting step. In most cases, expressions affected by modulo or division operations are affine functions of the loop iterators and a straight-forward application of the technique can be done. This approach is applicable to nested operations.

For example, using the above approach, the code segment:
for(i=0; i<20; i++)
B[1%3];
can be converted into the following code segment:
ptr=-1;
for(i=0; i<20; i++)
if(ptr >=3)
ptr -=3;
else ptr++;
B[ptr];

Furthermore for example, FIG. 11 illustrates certain exemplary source code. FIG. 12 illustrates the source of FIG. 11 subsequent to performing linear induction analysis.

Cost Calculation

Address expression optimization is formulated as a cost minimization problem. During the optimization step, transformations are selected and executed based on the resulting reduction in cost. In one embodiment of the invention, the cost is defined by the cost of a shared data-flow graph. For instruction-set based ACUs, the cost measures used by the cost functions of the different node types are based on a estimate of the number of cycles for a given instruction-set processor "family" (i.e., RISC, VLIW, etc.) and weighted by the execution rate of the corresponding application code scope. The cost of a shared data-flow graph is an estimate of the area of the cheapest possible implementation on a not multiplexed or a lowly-multiplexed custom data-path, and is defined as the sum of the cost of each node (v) in the shared data-flow graph. Signal type information can be used for calculating the cost of a shared data-flow graph. For some node in the graph, the cost is calculated based on the signal types of its input and output signals.

Using a small set of abstract operations to model both a larger set of arithmetic operations and operation sharing, means that a direct mapping of operations in a shared data-flow graph to operators in a custom data-path is not always possible for cost calculation. In most cases, the cost of an operation depends on its context. This is also the case for constants.

A distinction can be made between signal type context and node context. The signal type context of a node v includes the input and output signal types of v. The signal type context does not change when transformations are applied in the neighbourhood of v. The node context of a node v consists of the nodes in the the neighbourhood of v. The node context does change when transformations are applied in the neighbourhood of v. As us used below, a context-dependent cost (function) is defined as a cost (function) that depends on the node context. Context-dependent or not, each cost (function) depends on the signal type context:

The cost of a constant is context-dependent. In those situations where a constant is used as 'control input', the cost of the constant is zero. An example is a constant multiplication, which is expanded into an add/sub/shift network depending on the value of the constant. Another example is a delay operation, whose size, i.e., number of registers in a register file) is given by the value of the constant. In all other situations, the cost of a constant is the cost of storing the constant in a (index) register file.

The cost of an input and output is zero. The cost of an addition is not context-dependent. If an addition has more than two input ports, the best possible, i.e., minimum cost) expansion into binary additions among all modes is chosen. For a binary addition, the maximal cost among all modes is chosen. For one mode, the cost is calculated as follows: (i) the cost of an addition with two constants (c1+c2) is zero; (ii) the cost of an addition with a constant equal to zero (a+0) is zero; (iii) the cost of an addition with a constant equal to one (a+1) is the cost of executing the operation in an half adder in a programmable processor; (iv) otherwise the cost of an addition is the cost of a full adder in the programmable processor.

The cost of a multiplication is context-dependent. If a multiplication has more than two input ports, the best possible, i.e., minimum cost expansion into binary multiplication among all modes is chosen. For a binary multiplication, the maximal cost among all modes is chosen.

For one mode, the cost is calculated as follows: (i) the cost of a multiplication with two constants (c1×c2) is zero; (ii) the cost of a multiplication with a constant equal to zero (a×0) or one (a×1) is zero; (iii) the cost of a multiplication with a constant equal to minus one (a×(−1)) is either the cost of an n-bit invertion if the output signal is used only by additions, or the cost of an n-bit invertion plus the cost of executing the resulting operation in a half adder in the programmable processor; (iv) the cost of a multiplication with a positive power-of-two constant (a×2^m) is the cost of a shifting operation; (v) the cost of a multiplication with a negative power-of-two constant (a×−2^m) is either the cost of a shifting operation plus the cost of an n-bit invertion if the output signal is used only by additions, or the cost of a shifting operation, plus the cost of an n-bit invertion, plus the cost of executing the resulting operation in a half adder otherwise; (vi) the cost of a multiplication with any other constant (a×c1) is the cost of the expanded add/sub/shift network operation that can perform the multiplication; (vii) the cost of a multiplication with two variables (a×b) is the cost of executing the operation in a multiplier.

The cost of a delay is not context-dependent. A delay can occur only in a shared data-flow graph with one mode, because a delay cannot be shared. For one mode, the cost is calculated as follows: (i) the cost of a delay with a constant at the first input port (c1@b}) is zero; (ii) otherwise the cost of a delay is the cost of storing the signal in a register (file) with the number of register stores equal to the value of the constant at the second input port.

The cost of a select operation is context-dependent. In one embodiment of the invention, it is calculated as follows. The worst-case wordlength at each input port is determined among all signal types whose mode is in the demand set of that input port. Next, except for the smallest wordlength, all wordlengths are added up. The number obtained is the total number of multiplexing bits that are required for all select operations.

The motivation behind this calculation is that the cheapest expansion of an n-ary select operation is obtained by iteratively splitting off the two input ports with the smallest wordlengths. The cost in bits of the select operation split off is the largest of the two wordlengths. This wordlength is also the one to use for the new input port of the (n−1)-ary select operation that remains. In other words, the smallest wordlength is removed from the set of wordlengths of the select operation, and the cost is increased with the second smallest wordlength, which becomes the new smallest wordlength.

Execution of Compiled Code

The compiled code is optimized for execution on an essentially digital device, either an existing programmable one, a plurality of programmable processors, possibly having certain custom hardware.

The compiled code can be optimally executed on such digital devices when certain features within the calculation units, such as auto-increment, are used. The above optimizations reduce the amount of overhead for controlling the calculation units, also called local control overhead, and minimize the number of accesses to the registers. The optimization process of the optimizing system 104 advantageously minimizes index register allocation and local control overhead. Since after optimization there are fewer operations, less intermediate variables are needed. These variables are typically allocated by compiler in a register file. By having to allocate less variables in registers, register allocation is minimized. Similarly, when less operations are required to execute due to optimizing address arithmetic, the decoder needs decode less instructions.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of optimizing address expressions within source-level code, wherein the source-level code describes the functionality of an application to be executed on a digital device, the method comprising:
inputting a first source-level code that describes the functionality of the application, the first source-level code comprising address computation code and a plurality of arrays with address expressions in at least one programming loop construct, wherein the address computation code or one of the address expressions has nonlinear operations; and
transforming the first source-level code into a second source-level code that describes substantially the same functionality as the first source-level code, wherein the second source-level code has fewer nonlinear operations to be executed than the first source-level code, and wherein the second source level code has the same number of loop constructs as the first source-level code,
wherein the digital device comprises at least one programmable instruction set processor and wherein transforming the first source-level code into a second source-level code comprises:
executing a first code transformation comprising algebraic code transformations and common subexpression elimination code transformations,
after executing the first code transformation, executing a second code transformation comprising code hoisting, and
after executing the second code transformation, executing a third code transformation comprising induction analysis.

2. The method of in claim 1, wherein the nonlinear operations are selected from the group comprising: modulo operations, integer division operations, power operations and multiplication operations.

3. The method of claim 1, wherein the arrays are multi-dimensional arrays.

4. The method of claim 1, wherein the first, second source-level code and intermediate source-level codes generated are represented as shared data-flow graphs.

5. The method of claim 4, wherein the shared data-flow graphs are directed acyclic graphs with homogeneous synchronous data-flow behavior.

6. The method of claim 5, wherein the shared data-flow graph enables modeling in a single subgraph address expressions and address calculation code with substantially different iterators.

7. The method of claim 6, wherein the method uses a select operation for enabling single subgraph modeling.

8. The method of claim 4, wherein the method time-multiplexes calculations that are related to address expressions.

9. The method of claim 1, wherein the method is independent of the digital device architecture.

10. The method of claim 9, wherein the method does not use detailed knowledge of the target device of the source code.

11. The method of claim 1, wherein the method transforms the source-level codes by applying composite transformations with look-ahead local minima avoiding capabilities.

12. The method of claim 11, wherein the composite transformations comprise a finite predetermined sequence of elementary, non-decomposable transformations, wherein each of the elementary transformations are executable if a single set of conditions related to the elementary transformation are satisfied, wherein each of the composite transformations are composed such that the composite transformation can be executed if one of a plurality of sets of conditions is satisfied.

13. The method of claim 12, wherein the composite transformation transforms a first source-level code with a first cost into a second source-level code with a second cost, the second cost being lower than the first cost, and while executing the elementary transformation of which the composite transformation is composed of, intermediate source-level codes are generated, at least one of the intermediate source-level codes having a cost being larger than the first cost.

14. The method of claim 1, wherein transforming comprises applying an algebraic transformation on at least one of the address expressions or part of the address calculation code, wherein the algebraic transformation replaces at least a part of the address expressions or part of an expression within the address computation code by another equivalent expression.

15. The method of claim 13, wherein the execution of the composite transformations is performed on shared data-flow graph representations of the source-level codes.

16. The method of claim 15, wherein applying the algebraic transformation increases the number of common subexpressions that are affected by nonlinear operations.

17. The method of claim 1, wherein the transformation comprises common subexpression elimination on at least one of the address expressions or part of the address computation code, and wherein the common subexpression elimination detects a subexpression that is found within at least two expressions within either the address expressions or the address computation code and replaces the subexpression with a single variable, wherein the variable is computed via the subexpression higher in the code, the variable computation becoming part of the address computation code.

18. The method of claim 17, wherein the common subexpression elimination decreases the amount of nonlinear operations to be executed within the source-level code.

19. The method of claim 1, wherein at least one piece of address calculation code is located within a selected scope and transforming comprises code hoisting wherein a part of the piece of address calculation code is moved outside the scope.

20. The method of claim 1, wherein the moving of the part of the piece of address calculation code reduces the amount of executions of nonlinear operations within the part of the piece of address calculation code.

21. The method of claim 19, wherein code hoisting is applied across the scope of a loop construct.

22. The method of claim 19, wherein code hoisting is applied across the scope of a conditional.

23. The method of claim 22, wherein code hoisting is based on a range analysis.

24. The method of claim 23, wherein code hoisting is considered for applying only for expressions with overlapping ranges.

25. The method of claim 23, wherein the code hoisting is applied only to expressions with at least one common factor.

26. The method of claim 23, wherein code hoisting is applied for equal expressions only when the sum of their ranges is larger than the overall range.

27. The method of claim 23, wherein code hoisting is applied for non-equal expressions after a cost-benefit analysis that evaluates: the degree of similarity of the non-equal expressions, the degree of similarity being expressed as the amount of common subexpressions within the non-equal expressions, their costs and the cost after a potential code hoisting step.

28. The method of claim 1 wherein modulo related algebraic transformation combined with a common subexpression elimination and code hoisting are executed iteratively.

29. The method of claim 1, wherein a linear induction analysis based step is applied on at least one address expression, which is piece wise linear, the induction analysis step replaces the address expression with single pointer arithmetic and a single conditional.

30. The method of claim 29, wherein the piece wise linear address expression comprise at least of one of the group comprising: a modulo operation or a division operation.

31. The method of claim 30, wherein the piece wise linear address expression comprises nested operations.

32. The method of claim 1, wherein nonlinear induction analysis is applied on at least one address expression, which is nonlinear, wherein the induction replaces the address expression with add, accumulate, constant division and constant multiplication operations or combinations thereof.

33. The method of claim 1, wherein the loop construct of the first source-level code is structured to loop the same number of times as the loop construct of the second source-level code.

34. The method of claim 1, wherein transforming comprises generating conditional expressions.

35. A system for address expression optimization of source-level code, wherein the source-level code describes the functionality of an application to be executed on a digital device, wherein the digital device comprises at least one programmable instruction set processor, the system comprising:
    means for inputting a first source-level code that describes the functionality of the application, the first source-level code comprising address computation code and a plurality of arrays with address expressions in at least one programming loop construct, wherein at least the address computation code or one of the address expressions has nonlinear operations; and
    means for transforming the first source-level code into a second source-level code that describes substantially the same functionality as the first source-level code, wherein the second source-level code has fewer nonlinear operations to be executed than the first source-level code,
    wherein the means for transforming comprises means for performing a linear induction analysis step on at least one piece wise linear address expression and wherein performing the induction analysis step comprises replacing the address expression with single pointer arithmetic and a single conditional,
    wherein the second source level code has the same number of loop constructs as the first source-level code, and
    wherein the means for transforming the first source-level code into the second source-level code is configured to:
        execute a first code transformation comprising algebraic code transformations and common subexpression elimination code transformations,
        after executing the first code transformation, execute a second code transformation comprising code hoisting, and
        after executing the second code transformation, execute a third code transformation comprising induction analysis.

36. The system of claim 35, wherein the loop construct of the first source-level code is structured to loop the same number of times as the loop construct of the second source-level code.

37. A system for address expression optimization of source-level code, wherein the source-level code describes the functionality of an application to be executed on a digital device, the system comprising:
    an optimizing system for receiving a first source-level code that describes the functionality of the application, wherein the first source-level code has nonlinear operations in at least one programming loop construct, and wherein the optimizing system transforms the first source-level code into a second source-level code that has fewer nonlinear operations to be executed than the first source-level code, and wherein the second source level code has the same number of loop constructs as the first source-level code, and wherein the digital device comprises at least one programmable instruction set processor, wherein the optimizing system transforms the first source-level code by performing a linear induction analysis step on at least one piece wise linear address expression and wherein performing the induction analysis step comprises replacing the address expression with single pointer arithmetic and a single conditional, and wherein the optimizing system transforms the first source-level code into the second source-level code by:

executing a first code transformation comprising algebraic code transformations and common subexpression elimination code transformations, after executing the first code transformation, executing a second code transformation comprising code hoisting, and after executing the second code transformation, executing a third code transformation comprising induction analysis.

38. The system of claim 37, wherein the loop construct of the first source-level code is structured to loop the same number of times as the loop construct of the second source-level code.

39. A non-transitory computer-readable storage medium with executable code stored thereon, said executable code having been optimized by a method comprising:

transforming first source-level code having at least one programming loop construct and an at least one nonlinear address expression within the programming loop construct, the first source level code into a second source-level code that describes substantially the same functionality as the first source-level code, wherein the second source-level code has fewer nonlinear operations to be executed than the first source-level code, and wherein the second source-level code has the same number of loop constructs as the first source-level code and wherein the second source-level code has been compiled for subsequent execution on a programmable instruction set processor, wherein transforming the first source-level code comprises performing a linear induction analysis step on at least one piece wise linear address expression and wherein performing the induction analysis step comprises replacing the address expression with single pointer arithmetic and a single conditional, and wherein transforming the first source-level code into the second source-level code comprises:

executing a first code transformation comprising algebraic code transformations and common subexpression elimination code transformations, after executing the first code transformation, executing a second code transformation comprising code hoisting, and after executing the second code transformation, executing a third code transformation comprising induction analysis.

40. The executable code of claim 39, wherein the loop construct of the first source-level code is structured to loop the same number of times as the loop construct of the second source-level code.

* * * * *